Jan. 12, 1960  J. L. BOICEY  2,921,257
METHOD OF TESTING ELECTRICALLY CONDUCTING FILMS
Filed Dec. 28, 1956
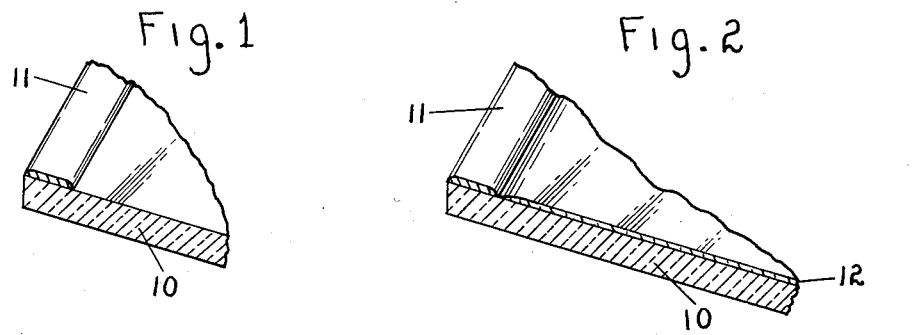
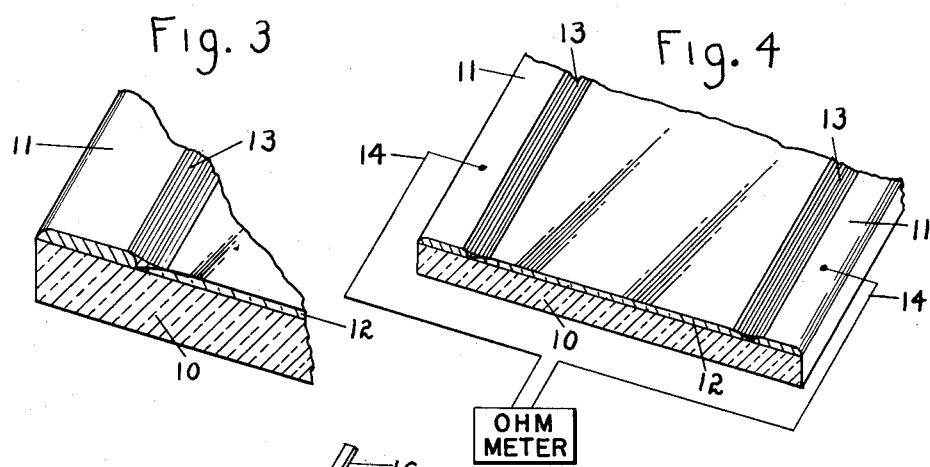
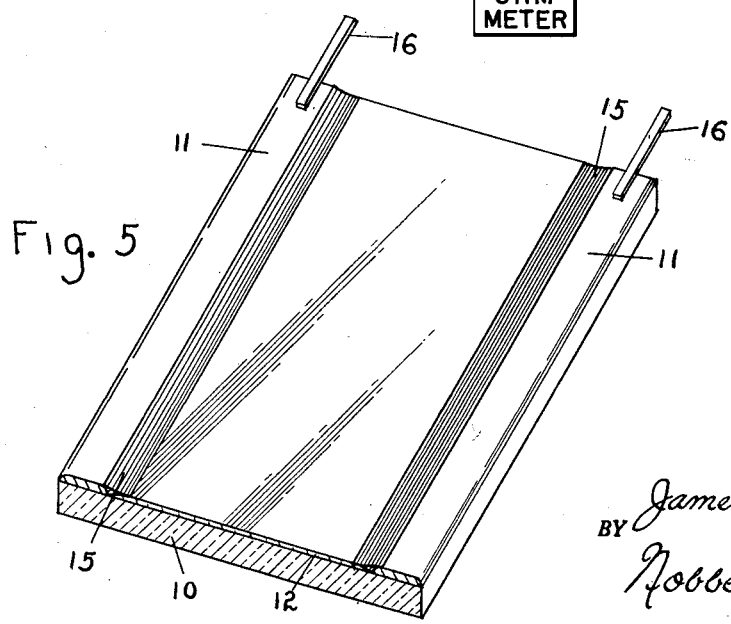
INVENTOR.
BY *James L. Boicey*
*Nobbe & Swope*
ATTORNEYS United States Patent Office 2,921,257
Patented Jan. 12, 1960

2,921,257

METHOD OF TESTING ELECTRICALLY CONDUCTING FILMS

James L. Boicey, Toledo, Ohio, assignor to Libbey-Owens-Ford Glass Company, Toledo, Ohio, a corporation of Ohio Application December 28, 1956, Serial No. 631,096

4 Claims. (Cl. 324—65)

The present invention relates broadly to a method for testing electrically conducting films and more particularly to the testing of the electrical conducting properties of an article having a ceramic base and a continuous, electrically conducting film applied to one surface of the base between a pair of spaced electrodes on the same surface.

Although the invention is in no way restricted to the testing of electrically conducting films of any particular type or composition, or to their use with any particular kind of base or supporting surface, it has proven most valuable in connection with transparent, electrically conducting films of tin oxide on glass sheets, and it will be specifically described in that connection here. Such units have been used for aircraft windshields and the like, in which the electrically conducting film is used to heat the sheet to a temperature at which ice or frost will be removed, or its formation prevented on the surface of the exposed face of the unit.

It is customary in the manufacture of such units to first provide a sheet of glass with electrodes along the margins thereof, and then the sheet is hung or suspended from a carriage. In this way, the sheet is passed into and through a tunnel-type furnace within which it is heated to substantially its point of softening to prepare the sheet for filming, and to fire on the electrodes when metal-flux electrode material is used. After the sheet has reached the required temperature, it is removed from the furnace and uniformly sprayed over its entire surface with a filming liquid.

When it is desired to produce a tin oxide film, the filming liquid may be a solution of tin halides, such as any of the tin compounds known to produce a film of the desired characteristics. For example, stannic tetrachloride will react with the hot glass to leave a thin, transparent, tightly adherent, electrically conducting film or coating of tin oxide on the glass. The film normally covers the entire surface of the glass and is in electrical contact with the electrodes, however, in such a process difficulty has been encountered from the pressure of a weak interface between the electrode and the electrically conducting film. This weak interface often causes arcing and breakdown of the unit if a voltage is applied to the electrodes and also causes a high resistance at the interface so that the surface resistivity of the film cannot be measured by applying a voltage to the electrodes.

In the preparation of such electrically conducting films, it is necessary to control the filming conditions accurately in order to provide the desired film, and in the production process, it is desirable to check the surface resistivity of the film as soon as it is applied in order to control the filming conditions and discover any departure from the desired film before an undue number of glass sheets are filmed improperly.

It is therefore a primary object of this invention to provide a method of quickly and accurately checking the surface resistivity of the electrically conducting film immediately after the formation thereof.

In accordance with this invention, the surface resistivity of the electrically conducting film may be measured after filming by applying a temporary fillet of an electrically conducting material such as colloidal graphite along the junction of the electrode and the electrically conducting film. An electric current is then applied to the film and the resistance measured by conventional methods, so that tendencies toward unwanted increase or decrease of this value may generally be corrected before films are applied to other sheets which do not meet the required specifications. Those units meeting the specifications are washed to remove the graphite and finished with a permanent silver overlay and appropriate lead wires are attached to each of the electrodes to form a finished unit. Those units found to be electrically defective are immediately rejected and may be scrapped or in some instance, may be salvaged for other purposes.

Another object of this invention is to provide test means for determining electrical faults in the unit prior to completion and while still in a stage where it is economically feasible to scrap or salvage without further expenditure.

It is another object of this invention to provide a temporary film-to-electrode fillet which is quickly and easily applied.

It is still another object of this invention to provide a temporary film-to-electrode fillet which is low in cost.

Other objects and advantages of the invention will become more apparent during the course of the following description, when taken in connection with the accompanying drawings.

In the drawings, wherein like numerals are employed to designate like parts throughout the same:

Fig. 1 is a fragmentary section in perspective showing a sheet of glass with an electrode mounted on the surface along one edge;

Fig. 2 is a fragmentary section in perspective in which the tin oxide film has been applied;

Fig. 3 is an enlarged fragmentary section in perspective showing the positioning of the colloidal graphite fillet;

Fig. 4 is a fragmentary section in perspective of the assembly of Fig. 3 ready for test; and Fig. 5 is a perspective of the finished product after removal of the graphite fillet and application of the silver fillet.

Referring more specifically to the drawings in which like numerals are applied to like parts, the numeral 10 indicates a sheet of glass to one surface of which two electrodes 11 are applied along opposed margins. The electrodes may be of sprayed copper or copper alloys, baked on gold, silver and platinum fluxes or combinations of these materials or may be thin strip stock of any of the above materials bonded to the surface by a compatible frit.

Next, the electrically conducting film 12 is applied to provide an article as illustrated in Fig. 2. The film 12 may be applied by any procedure which will provide an electrically conducting film in contact with the electrode 11 such as the method described above and this invention is applicable in processes in which a weak interface may result between the electrode 11 and the electrically conducting film 12. It is also contemplated that this invention may be used to advantage in processes in which the film is applied prior to application of the electrode material. The unit is tested in accordance with this invention in order to control the process and provide early determination of rejects.

In order to test the unit, an electrically conducting material is applied at the interface of the electrode and the electrically conducting film as shown in Fig. 3, in which the electrically conducting material is applied to form a temporary fillet 13. The fillet may be any easily removable electrically conducting material such as suspensions of graphite or metal materials. The preferred material is a colloidal suspension of graphite in water containing 20% solids. This suspension may be applied along the interface by spraying or brushing or by any suitable applicator. However, I prefer to use an applicator wheel which has a portion thereof in contact with the suspension and which is rolled along the interface whereby a thin coating of suspension is applied both to the electrode 11 and the electrically conducting film 13. Since the glass is still warm from the filming treatment, the small amount of water in the narrow coating of colloidal solution evaporates almost as quickly as it is applied to provide a dry electrically conducting coating or fillet of finely divided carbon.

Temporary leads 14 are then connected to the electrodes 11 as shown in Fig. 4 and may be attached thereto by clamps or other suitable connecting means. These lead wires are wired to a source of power and instruments which are conventional for measuring the resistance of the electrically conducting film between the bus bars, such as an ohmmeter. This value is checked to determine if the unit is within specifications and also checked against the value of the previously tested units to determine if any trend is developing that needs correcting in the filming process so that the process may continue in production like fashion with a minimum of rejects.

If the unit conforms to the specifications, the fillets 13 are washed off, and the unit is dried. This washing may be accomplished by jets of steam or hot air, and the drying is effected by blowing dry air over the cleaned area. It is important to avoid any procedure which might damage the electrically conducting film, and when graphite is used as described above, it is not necessary to wipe the surface in cleaning in order to remove substantially all of the graphite material. This has the advantage of avoiding an abrasive action which might damage the film. After cleaning, permanent fillets or overlays 15 of a silver material are applied along the interface between the film and the electrode. Such application is described in detail in a patent to Romey A. Gaiser, No. 2,628,299, issued February 10, 1953.

Leads 16 are then soldered on the electrodes to provide the finished unit as shown in Fig. 5.

It is to be understood that the form of the invention disclosed herein is to be taken as the preferred embodiment thereof, and that various changes in the shape, size and arrangement of parts as well as procedural changes may be resorted to without departing from the spirit of the invention or the scope of the following claims.

I claim:

1. A method of testing an electrically conducting unit during fabrication thereof, which comprises applying electrode material along spaced lines on a glass sheet, heating the sheet to substantially its softening point, spraying the heated sheet with a solution of tin halide to form an electrically conducting film thereon, applying removable electrically conducting material along the junction of the electrode and the electrically conducting film, and applying an electric current to the film to measure its surface resistivity.

2. A method of testing an electrically conducting unit as defined in claim 1, in which the removable electrically conducting material is a colloidal suspension of graphite.

3. A method of testing an electrically conducting unit as defined in claim 2, in which the graphite is removed after the measurement of surface resistivity.

4. A method of measuring the surface resistivity of a transparent electrically conducting film having electrodes in contact therewith, which comprises applying a colloidal suspension of graphite along the junction of the electrode and electrically conducting film, applying an electric current to the film to measure its surface resistivity, and removing the graphite from the electrically conducting unit.

References Cited in the file of this patent

UNITED STATES PATENTS

| | | |
|---|---|---|
| 2,064,651 | Fiene | Dec. 15, 1936 |
| 2,613,302 | Gurewitsch | Oct. 7, 1952 |
| 2,628,299 | Gaiser | Feb. 10, 1953 |
| 2,730,598 | Lytle | Jan. 10, 1956 |
| 2,833,902 | Gaiser et al. | May 6, 1958 |